(12) United States Patent
Cheng

(10) Patent No.: US 12,742,923 B2
(45) Date of Patent: Sep. 22, 2026

(54) LIGHT SOURCE MODULE AND REFLECTIVE DISPLAY DEVICE

(71) Applicant: E Ink Holdings Inc., Hsinchu (TW)

(72) Inventor: Chao-Chun Cheng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 273 days.

(21) Appl. No.: 18/389,800

(22) Filed: Dec. 20, 2023

(65) Prior Publication Data

US 2024/0310574 A1 Sep. 19, 2024

(30) Foreign Application Priority Data

Mar. 17, 2023 (TW) ................................ 112109908

(51) Int. Cl.
*G02B 6/00* (2006.01)
*F21V 8/00* (2006.01)

(52) U.S. Cl.
CPC ......... *G02B 6/0091* (2013.01); *G02B 6/0068* (2013.01); *G02B 6/0083* (2013.01)

(58) Field of Classification Search
CPC ................................ G02B 6/0068; G02B 6/00
USPC .......................................................... 385/129
See application file for complete search history.

(56) References Cited

U.S. PATENT DOCUMENTS 4,445,759 A * 5/1984 Valette ................. G02B 6/1245 216/101
6,579,606 B1 * 6/2003 Uchiya ................ G02B 5/0242 428/323
7,583,349 B2 * 9/2009 Sugiyama .............. H05K 1/147 349/149
8,749,729 B2 * 6/2014 Sasaki .................. G02B 6/0021 349/65
10,082,614 B2 * 9/2018 Bang .................... G02B 6/0028
10,620,361 B2 * 4/2020 Bang .................... G02B 6/0031
2008/0117367 A1 * 5/2008 Abe .................... G02F 1/13452 349/106
2009/0135627 A1 * 5/2009 Furuyama ............ G02B 6/0055 362/624
2010/0231826 A1 * 9/2010 Itou ...................... G02B 6/0056 349/64
2013/0155723 A1 * 6/2013 Coleman .............. G02B 6/0018 362/621

(Continued)

FOREIGN PATENT DOCUMENTS

TW 201348817 A 12/2013
TW 201602664 A 1/2016

OTHER PUBLICATIONS

The office action of corresponding TW application No. 112109908 issued on Feb. 26, 2024.

*Primary Examiner* — Kaveh C Kianni
(74) *Attorney, Agent, or Firm* — CKC & Partners Co., LLC

(57) ABSTRACT

A light source module which includes a flexible circuit substrate, a light-emitting component and a light guide film is provided. The light-emitting component and the light guide film are disposed on the flexible circuit substrate and both of them are on the same side of the flexible circuit substrate. A light-emitting surface faces the light guide film. The width of the light-emitting surface is between the farthest edge from the flexible circuit substrate and the nearest edge to the flexible circuit substrate. In addition, the width of the light-emitting surface is not larger than four times of the thickness of the light guide film.

14 Claims, 5 Drawing Sheets

(56) References Cited

U.S. PATENT DOCUMENTS

2016/0131814 A1 5/2016 Tai et al.
2018/0373097 A1* 12/2018 Kurata ................. G02B 6/0068
2021/0397049 A1* 12/2021 Allen ................ G02F 1/133524
2022/0055528 A1 2/2022 Bonn et al.
2022/0268984 A1* 8/2022 Nichol ................. G02B 6/0028

* cited by examiner

LIGHT SOURCE MODULE AND REFLECTIVE DISPLAY DEVICE

RELATED APPLICATIONS

This application claims priority to Taiwan Application Serial Number 112109908, filed Mar. 17, 2023, which is herein incorporated by reference in its entirety.

BACKGROUND

Technical Field

The present disclosure relates to a light source module and a display device using this light source module. More particular, the present disclosure relates to the reflective display device and its light source module.

Description of Related Art

In order to follow the trend towards thinner flexible displays and reduce the thickness of displays, the components inside the displays should be minified. For instance, a light source module inside a display includes a light guide generally, and thus the trend towards thinner flexible displays is caught up with by reducing the thickness of the light guide.

In present, light guide films (LGF) are applied on light source modules of reflective display devices. The light source (e.g. a LED) in the reflective display device emits light from its light emitting surface, and the light enters into the LGF through the light incident surface on one side of the LGF.

However, the light incident surface of the LGF is much smaller than the light emitting surface of the light source, and thus the coupling efficiency of light from the light source towards the LGF decreases due to the mismatch of their sizes. Furthermore, the difference between the LGF's light incident surface and the light source's light emitting surface in sizes causes difficulty of alignment during assembly. Thus, optical flaws are presented and thereby affecting the quality of display images.

SUMMARY

Accordingly, the disclosure is to provide a light source module. In this light source module, the width of the light-emitting surface is not larger than four times of the thickness of the light guide film, and thus the coupling efficiency of light of this light source module increases.

An embodiment of the disclosure provides a reflective display device including the aforementioned light source module.

At least one embodiment of the disclosure provides a light source module including a flexible circuit substrate, a light-emitting component located on the flexible circuit substrate and a light guide film located on the flexible circuit substrate. The light guide film and the light-emitting component are located on the same side of the flexible circuit substrate, and a first light-emitting surface of the light-emitting component faces the light guide film. A width is between two edges of the first light-emitting surface. One of the two edges is farthest from the flexible circuit substrate and the other one of the two edges is nearest to the flexible circuit substrate. The light guide film has a thickness, and the width of the first light-emitting surface is not larger than four times of the thickness.

At least in one embodiment of the disclosure, the thickness of the light guide film is not larger than 100 μm.

At least in one embodiment of the disclosure, the light source module further includes an opaque film located on the light guide film. The opaque film and the flexible circuit substrate are located on opposite sides of the light guide film.

At least in one embodiment of the disclosure, the opaque film covers a top surface of the light-emitting component.

At least in one embodiment of the disclosure, the opaque film covers the top surface of the light-emitting component completely.

At least in one embodiment of the disclosure, the opaque film includes a black masking layer and a white masking layer located between the black masking layer and the light guide film. The white masking layer is translucent.

At least in one embodiment of the disclosure, the opaque film includes a masking layer in the color except for black and white.

At least in one embodiment of the disclosure, a region of the opaque film directly touches the light guide film, and a length between one side of the region farthest from the first light-emitting surface and the other side of the region nearest to the first light-emitting surface ranges from 2 mm to 3 mm.

At least in one embodiment of the disclosure, the first light-emitting surface directly touches the light guide film.

At least in one embodiment of the disclosure, a distance between the first light-emitting surface and the light guide film is not larger than 1 mm.

At least in one embodiment of the disclosure, the light-emitting component further includes a second light-emitting surface, and the second light-emitting surface dose not face the light guide film and the flexible circuit substrate.

At least in one embodiment of the disclosure, the second light-emitting surface backs on to the flexible circuit substrate.

At least in one embodiment of the disclosure, the second light-emitting surface backs on to the light guide film.

At least in one embodiment of the disclosure, the second light-emitting surface is connected to the first light-emitting surface.

At least one embodiment of the disclosure provides a reflective display device including one of the aforementioned light source modules and a reflective display panel disposed opposite to the light source module.

According to the aforementioned embodiments, since the width of the light-emitting surface is not larger than four times of the light guide film, the coupling efficiency of light is improved. Therefore, the luminance of the light source module increases, thereby improving the image quality of the reflective display device.

BRIEF DESCRIPTION OF THE DRAWINGS

To illustrate more clearly the aforementioned and the other objects, features, merits, and embodiments of the present disclosure, the description of the accompanying figures are as follows.

DETAILED DESCRIPTION

Figure 1:
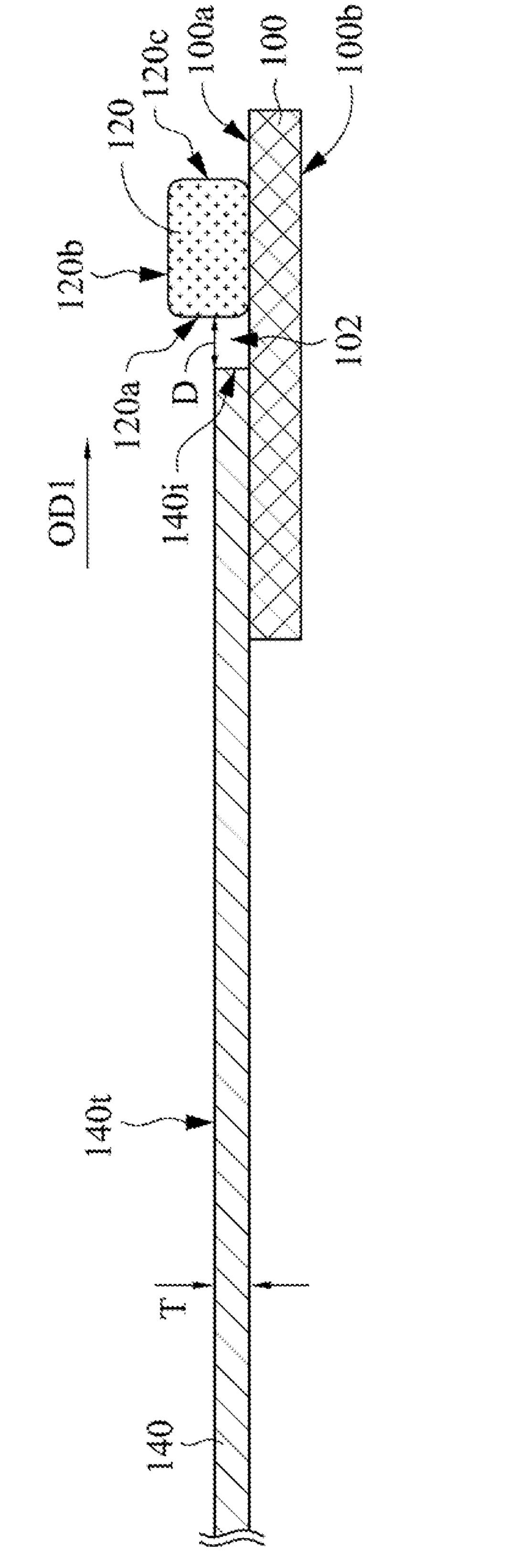
FIG. 1 illustrates a side view of a light source module in accordance with one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the following description, the dimensions (such as lengths, widths and thicknesses) of components (such as layers, films, substrates and regions) in the drawings are enlarged not-to-scale, and the number of components may be reduced in order to clarify the technical features of the disclosure. Therefore, the following illustrations and explanations are not limited to the number of components, the number of components, the dimensions and the shapes of components, and the deviation of size and shape caused by the practical procedures or tolerances are included. For example, a flat surface shown in drawings may have rough and/or non-linear features, while angles shown in drawings may be circular. As a result, the drawings of components shown in the disclosure are mainly for illustration and not intended to accurately depict the real shapes of the components, nor are intended to limit the scope of the claimed content of the disclosure.

Further, when a number or a range of numbers is described with "about," "approximate," "substantially," and the like, the term is intended to encompass numbers that are within a reasonable range considering variations that inherently arise during manufacturing as understood by one of ordinary skill in the art. In addition, the number or range of numbers encompasses a reasonable range including the number described, such as within +/−30%, +/−20%, +/−10% or +/−5% of the number described, based on known manufacturing tolerances associated with manufacturing a feature having a characteristic associated with the number. The words of deviations such as "about," "approximate," "substantially," and the like are chosen in accordance with the optical properties, etching properties, mechanical properties or other properties. The words of deviations used in the optical properties, etching properties, mechanical properties or other properties are not chosen with a single standard.

FIG. 1 illustrates a side view of a light source module 10 in accordance with one embodiment of the present disclosure. Referring to FIG. 1, the light source module 10 includes a flexible circuit substrate 100, a light-emitting component 120 and a light guide film 140. The flexible circuit substrate 100 has the surface 100*a* and the surface 100*b* on its two opposites respectively while the light-emitting component 120 and the light guide film 140 are located on the same side of the flexible circuit substrate 100. For example, the light-emitting component 120 and the light guide film 140 are on the surface 100*a* of the flexible circuit substrate 100 as shown in FIG. 1.

In the embodiment, the flexible circuit substrate 100 may be a flexible printed circuit board (FPCB), while the light-emitting component 120 may be an electroluminescence (EL) such as a LED. The light-emitting component 120 is connected to the flexible circuit substrate 100, so that the controlling component (not shown) disposed on the flexible circuit substrate 100 can drive the light-emitting component 120 to illuminate. In various embodiments of the present disclosure, the light-emitting component 120 may have cool color temperature (e.g. 6500K) or warm color temperature (e.g. 3500K).

Referring to FIG. 1, the light guide film 140 of the embodiment has one side named as light incident surface 140*i*, and the light-emitting component 120 includes the light-emitting surface 120*a* facing the light guide film 140. Thus, the light is emitted from the light-emitting surface 120*a* toward the light guide film 140 and then enters the light guide film 140 via the light incident surface 140*i*.

Figure 2:
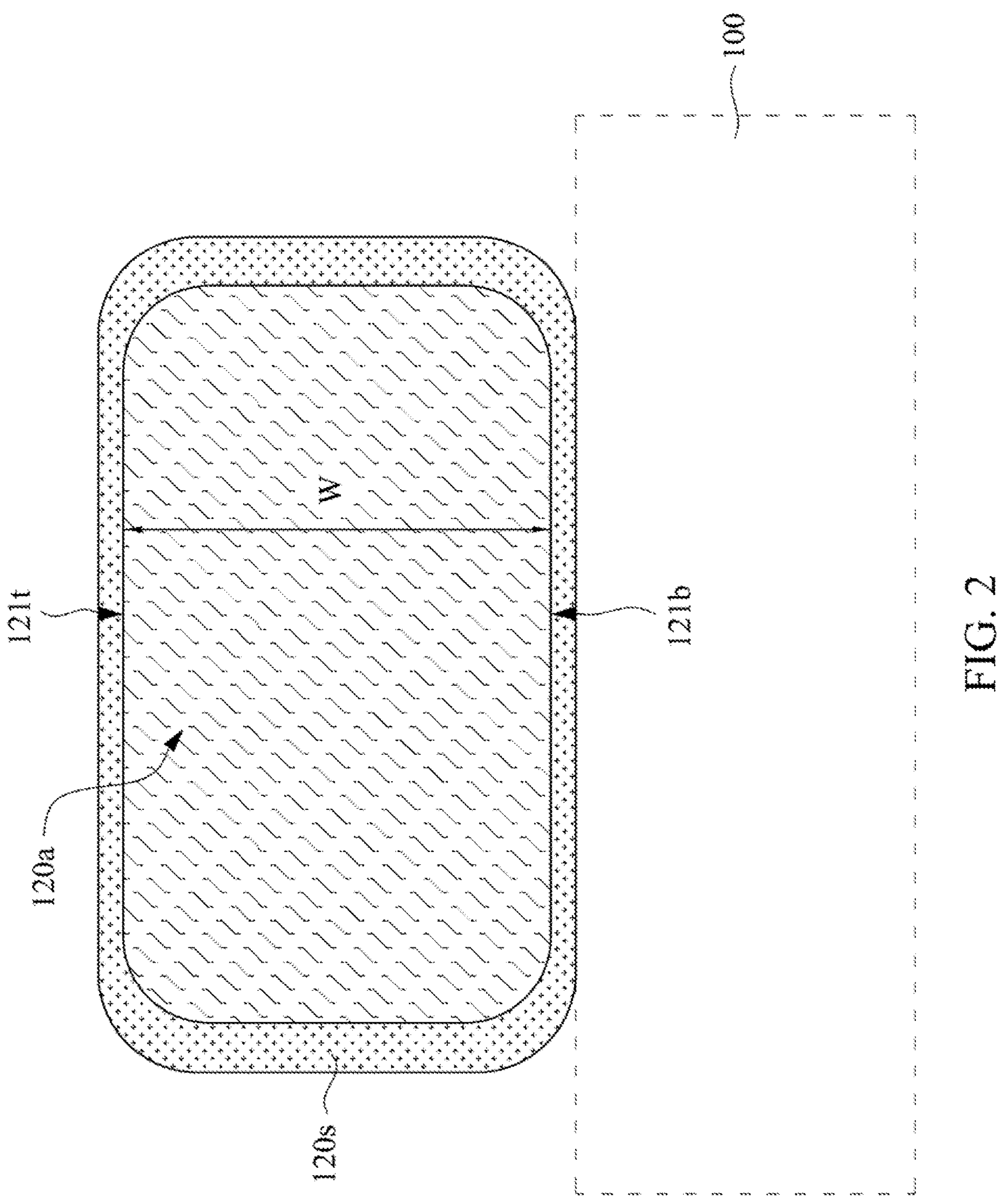
FIG. 2 illustrates a front view of a light-emitting surface of the light-emitting component of FIG. 1.

FIG. 2 illustrates a front view of the light-emitting surface 120*a* of the light-emitting component 120. Referring to FIG. 1 and FIG. 2, the light-emitting surface 120*a* in FIG. 2 is depicted in the observing direction OD1 of FIG. 1. As shown in FIG. 2, the light-emitting surface 120*a* has the edge 121*t* and the edge 121*b*, and the width W is between the edge 121*t* farthest from the flexible circuit substrate 100 (i.e., the top edge of the light-emitting surface 120*a* in FIG. 1) and the edge 121*b* nearest to the flexible circuit substrate 100 (i.e., the bottom edge of the light-emitting surface 120*a* in FIG. 1).

Furthermore, the light-emitting component 120 may be a LED which includes the casing 120*s* and the chip (not shown). The casing 120*s* may be formed with molding compound, and the chip may generate the light emitted from the light-emitting surface 120*a*. In addition, the casing 120*s* may include fluorescent materials which change the wavelength of the light generated from the chip, and thus the color of the light is changed.

It is worth mentioning, in addition to the light-emitting surface 120*a*, the light-emitting component 120 may include at least one additional light-emitting surface in other embodiments of the present disclosure. For example, the light-emitting component 120 shown in FIG. 1 may further include the light-emitting surface 120*b* and three light-emitting surfaces 120*c* (FIG. 1 depicts one of the light-emitting surfaces 120*c*) while the light-emitting surface 120*b* and the light-emitting surfaces 120*c* do not face the light guide film 140 and the flexible circuit substrate 100. In particular, the light-emitting surface 120*b* may be the top surface of the light-emitting component 120 and back on to the flexible circuit substrate 100 as shown in FIG. 1. Three light-emitting surfaces 120*c* may be configured to take a shape of "U". That is, two of the light-emitting surfaces 120*c* are connected to the light-emitting surface 120*a* while the rest one of the light-emitting surfaces 120*c* is disposed opposite to the light-emitting surface 120*a* and backs on to the light guide film 140.

The light guide film 140 covers the flexible circuit substrate 100 partially and has the thickness T which is less than or equal to 100 μm, that is, the thickness T is not larger than 100 μm. In various embodiments of the present disclosure, four times of the thickness T of the light guide film 140 may be larger than or equal to the width W of the light-emitting surface 120*a*. In other words, the width W of the light-emitting surface 120*a* is not larger than four times of the thickness T of the light guide film 140 (i.e., 4T≥W). As a result, the on-axis luminance of the light source module 10, namely the center luminance of the top surface 140*t* on the light guide film 140, may range from 99.4 nits to 104.1 nits. The average luminance of the light incident region, namely the average luminance of the top surface 140*t* near the light incident surface 140*i*, may range from 93.8 nits to 107.6 nits. In addition, the average luminance of the light source module 10 may range from 88.5 nits to 95.0 nits.

It should be noted, although the thickness T of the light guide film 140 is not larger than 100 μm in this embodiment, the thickness T of the light guide film 140 of the present disclosure is not limited hereto. The thickness T of the light guide film 140 may be larger than 100 μm in other embodiments of the present disclosure. In addition, the materials of the light guide film 140 may include Polymethylmethacrylate (PMMA) resin, Polycarbonate (PC) resin, Methylmethacrylate-Styrene (MS) resin or other resins thereof.

Referring to FIG. 1, the distance D is between the light-emitting surface 120*a* and the light guide film 140. In this embodiment, the distance D between the light-emitting surface 120*a* and the light guide film 140 is not larger than 1 mm but the present disclosure is not limited hereto. The distance D may be larger than 1 mm in other embodiments. The distance D located between the light-emitting surface 120*a* and the light guide film 140 may form the cavity 102 filled with air or other gases. It is worth mentioning, the light-emitting surface 120*a* may directly touch the light guide film 140 in some embodiments of the present disclosure, and thus the cavity 102 may not be formed between the light-emitting surface 120*a* and the light guide film 140.

Figure 3:
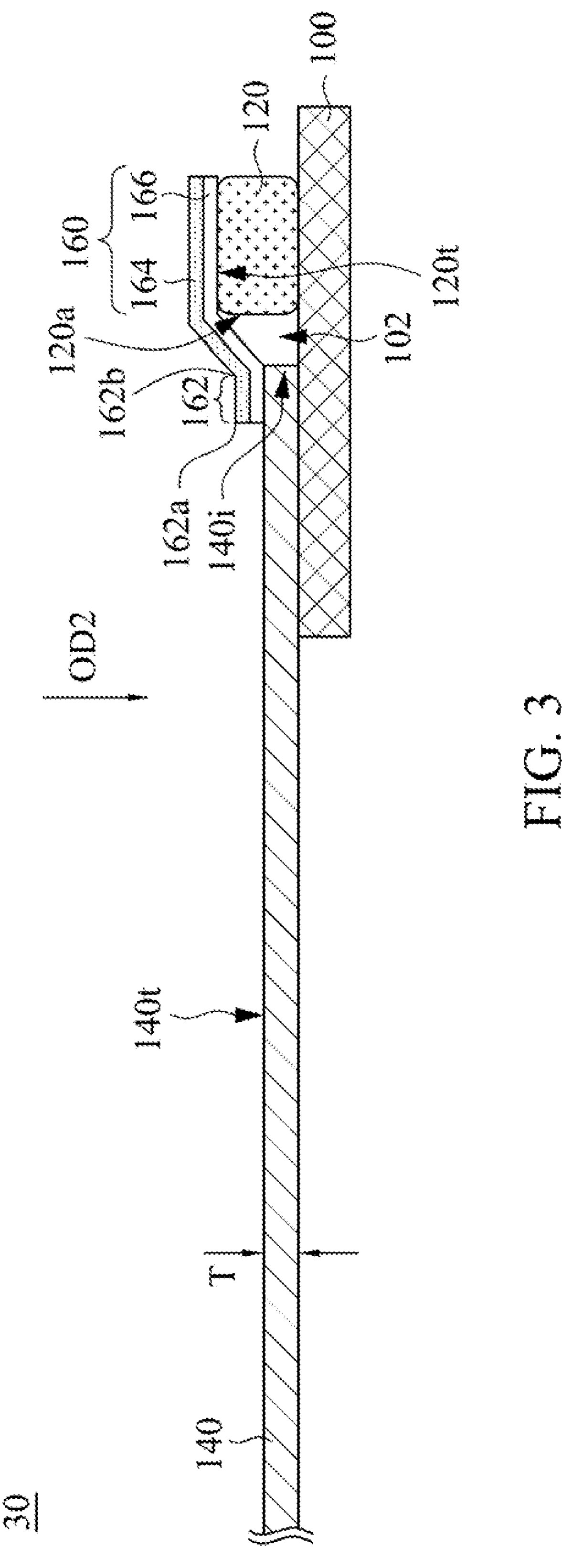
FIG. 3 illustrates a side view of a light source module in accordance with another embodiment of the present disclosure.

FIG. 3 illustrates a side view of the light source module 30 in accordance with one embodiment of the present disclosure. Referring to FIG. 3, the difference between the light source module 30 and the light source module 10 of FIG. 1 is that the light source module 30 further includes the opaque film 160. The opaque film 160 is located on the light guide film 140, and the opaque film 160 and the flexible circuit substrate 100 are located on two opposite sides of the light guide film 140 respectively. As shown in FIG. 3, the opaque film 160 is located on the top surface 140*t* of the light guide film 140.

In the embodiment of FIG. 3, the opaque film 160 covers the top surface 120*t* which is the same as the light-emitting surface 120*b* of the light-emitting component 120 in FIG. 1. The opaque film 160 covers the entire top surface 120*t* of the light-emitting component 120. In addition, the opaque film 160 covers the partial light guide film 140 instead of the entire light guide film 140. In particular, the region 162 of the opaque film 160 which may directly touch the light guide film 140 covers the light guide film 140.

Figure 4:
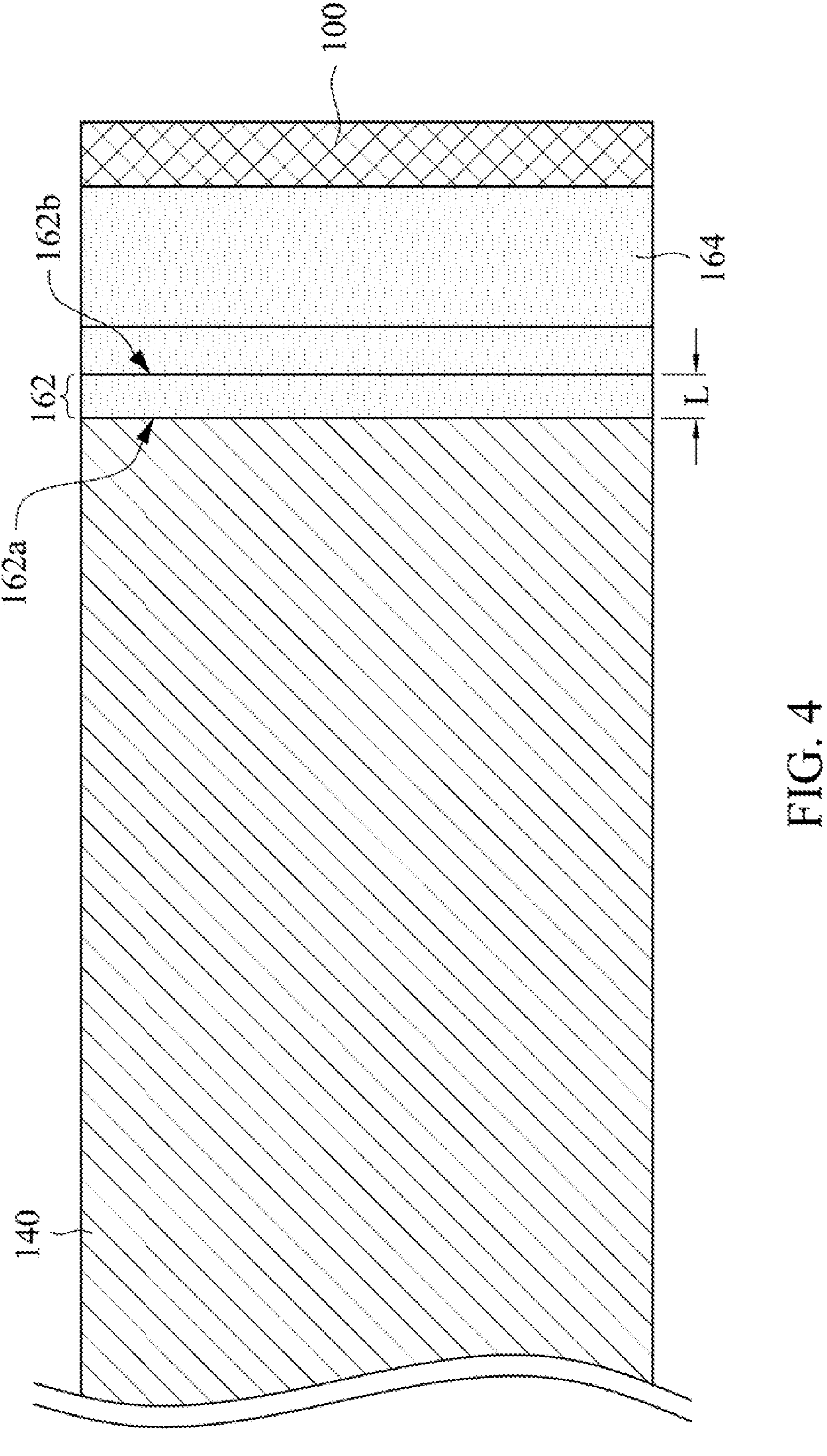
FIG. 4 illustrates a top view of the light source module of FIG. 1.

FIG. 4 illustrates a top view of the light source module 30. Referring to FIG. 3 and FIG. 4, the opaque film 160 in FIG. 4 is depicted in the observing direction OD2 of FIG. 3. As shown in FIG. 4, the region 162 of the opaque film 160 has two opposite sides: the side 162*a* and the side 162*b*. The length L of the region 162 is between the side 162*a* farthest from the light-emitting surface 120*a* (i.e., the left edge of the region 162 in FIG. 3) and the side 162*b* nearest to the light-emitting surface 120*a* (i.e., the right edge of the region 162 in FIG. 3). In some embodiments of the present disclosure, the length L may range from 2 mm to 3 mm but not limited hereto. In other embodiments, the length L of the present disclosure may be arbitrary.

As shown in FIG. 3, the opaque film 160 of the embodiment includes the black masking layer 164 and the white masking layer 166 while the white masking layer 166 is located between the black masking layer 164 and the light guide film 140. It is worth mentioning, the black masking layer 164 is opaque to the visible light but the white masking layer 166 is translucent to the visible light.

In other embodiments, the quantity of the masking layers (i.e., the black masking layer 164 and the white masking layer 166) within the opaque film 160 is not limited to two, but may be one and above. Furthermore, the color of the masking layer is not limited to black or white, that is, the opaque film 160 may include the masking layer in the other color, such as a yellow masking layer or a red masking layer. In addition, the opaque film 160 may include polyester film (such as PET-Mylar) or other translucent materials.

The black masking layer 164 included in the opaque film 160 has a high absorbance. When the partial light emitted from the light-emitting surface 120*a* does not hit the light guide film 140, the partial light may be absorbed by the opaque film 160, so that light leakage is prevented, and the effects of light leakage is reduced. Moreover, the effects on light uniformity of the light guide film 140 which are resulted from the scatter may be prevented by disposing the opaque film 160, thereby improving the light uniformity.

Figure 5:
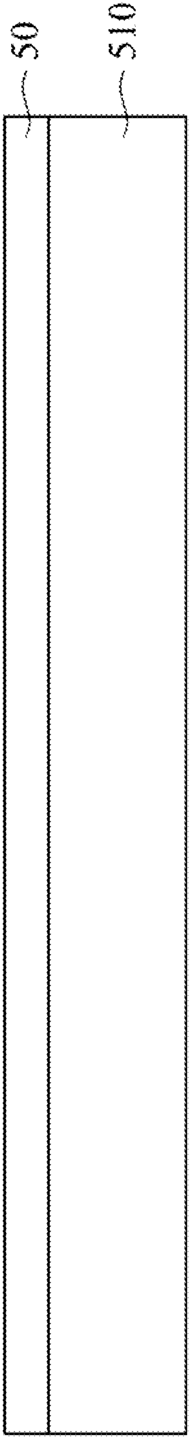
FIG. 5 illustrates a schematic diagram of a reflective display device in accordance with one embodiment of the present disclosure.

FIG. 5 illustrates a schematic diagram of the reflective display device 500 in accordance with at least one embodiment of the present disclosure. Referring to FIG. 5, the reflective display device 500 includes the light source module 50 and the reflective display panel 510 disposed opposite to the light source module 50. The light source module 50 in this embodiment is substantially equal to the light source module 10 or the light source module 30 in aforementioned embodiments. In other words, the light source in the reflective display device 500 may be the light source module 10 or the light source module 30.

As shown in FIG. 5, the light source module 50 covers the reflective display panel 510 which may include electrophoretic display panel, cholesteric liquid crystal display panel or similar kinds of display panels. The display brightness of the reflective display panel 510 may be improved by using one light source module of the aforementioned embodiments as its front light source.

In conclusion, the coupling efficiency of light may increase when the width of the light-emitting surface is not larger than four times of the light guide film, thereby increasing the luminance of the light source module. In addition, the opaque film disposed in the light source module may reduce the light leakage, and thus the uniformity of light may be improved. Therefore, the image quality of the reflective display device is improved.

Although the embodiments of the present disclosure have been disclosed as above in the embodiments, they are not intended to limit the embodiments of the present disclosure. Any person having ordinary skill in the art can make various changes and modifications without departing from the spirit and the scope of the embodiments of the present disclosure. Therefore, the protection scope of the embodiments of the present disclosure should be determined according to the scope of the appended claims.

What is claimed is:

1. A light source module comprising:

a flexible circuit substrate;

a light-emitting component, located on the flexible circuit substrate; and a light guide film, located on the flexible circuit substrate, wherein the light guide film and the light-emitting component are located on the same side of the flexible circuit substrate, and a first light-emitting surface of the light-emitting component faces the light guide film;

an opaque film, covering a top surface of the light-emitting component;

wherein a width is between two edges of the first light-emitting surface, wherein one of the two edges is farthest from the flexible circuit substrate and the other one of the two edges is nearest to the flexible circuit substrate;

wherein the light guide film has a thickness, and the width of the first light-emitting surface is not larger than four times of the thickness; and wherein a region of the opaque film directly touches the light guide film, and a length between one side of the region farthest from the first light-emitting surface and the other side of the region nearest to the first light-emitting surface ranges from 2 mm to 3 mm.

2. The light source module of claim 1, wherein the thickness of the light guide film is not larger than 100 μm.

3. The light source module of claim 1, wherein the opaque film is located on the light guide film, and the opaque film and the flexible circuit substrate are located on opposite sides of the light guide film.

4. The light source module of claim 1, wherein the opaque film covers the top surface of the light-emitting component completely.

5. The light source module of claim 1, wherein the opaque film comprises:

a black masking layer; and a white masking layer, located between the black masking layer and the light guide film, wherein the white masking layer is translucent.

6. The light source module of claim 1, wherein the opaque film comprises: a yellow masking layer.

7. The light source module of claim 1, wherein the first light-emitting surface directly touches the light guide film.

8. The light source module of claim 1, wherein a distance between the first light-emitting surface and the light guide film is not larger than 1 mm.

9. The light source module of claim 1, wherein the light-emitting component further comprises a second light-emitting surface, and the second light-emitting surface dose not face the light guide film and the flexible circuit substrate.

10. The light source module of claim 9, wherein the second light-emitting surface backs on to the flexible circuit substrate.

11. The light source module of claim 9, wherein the second light-emitting surface backs on to the light guide film.

12. The light source module of claim 9, wherein the second light-emitting surface is connected to the first light-emitting surface.

13. A reflective display device, comprising:

the light source module of claim 1; and a reflective display panel, disposed opposite to the light source module.

14. A light source module comprising:

a flexible circuit substrate;

a light-emitting component, located on the flexible circuit substrate; and a light guide film, located on the flexible circuit substrate, wherein the light guide film and the light-emitting component are located on the same side of the flexible circuit substrate, and a first light-emitting surface of the light-emitting component faces the light guide film;

an opaque film, located on a side of the light guide film opposite to the flexible circuit substrate;

wherein a width is between two edges of the first light-emitting surface, wherein one of the two edges is farthest from the flexible circuit substrate and the other one of the two edges is nearest to the flexible circuit substrate;

wherein the light guide film has a thickness, and the width of the first light-emitting surface is not larger than four times of the thickness; and wherein the opaque film extends to directly touch a top surface of the light-emitting component.

* * * * *